(12) United States Patent
Coats et al.

(10) Patent No.: US 8,170,787 B2
(45) Date of Patent: May 1, 2012

(54) VEHICLE COLLISION AVOIDANCE SYSTEM

(75) Inventors: Robert Martin Coats, Peoria, IL (US);
David Robert Pavlik, Peoria, IL (US);
Ramkumar Subramanian, Peoria, IL (US); David Edwards, Dunlap, IL (US)

(73) Assignee: Caterpillar Inc., Peoria, IL (US)

( * ) Notice: Subject to any disclaimer, the term of this patent is extended or adjusted under 35 U.S.C. 154(b) by 472 days.

(21) Appl. No.: 12/081,345

(22) Filed: Apr. 15, 2008

(65) Prior Publication Data

US 2009/0259400 A1 Oct. 15, 2009

(51) Int. Cl.
*G08G 1/16* (2006.01)
(52) U.S. Cl. ............................ 701/301; 340/435; 342/70
(58) Field of Classification Search .................. 701/301; 342/43–51, 65–66, 69, 76, 77, 94–97, 104–118, 342/126, 139, 146, 147–158, 357.06, 357.08
See application file for complete search history.

(56) References Cited

U.S. PATENT DOCUMENTS

| | | | |
|---|---|---|---|
| 5,091,726 A | 2/1992 | Shyu | |
| 5,307,136 A | 4/1994 | Saneyoshi | |
| 5,982,278 A | 11/1999 | Cuvelier | |
| 6,172,601 B1 | 1/2001 | Wada et al. | |
| 6,222,447 B1 | 4/2001 | Schofield et al. | |
| 6,226,572 B1 | 5/2001 | Tojima et al. | |
| 6,275,773 B1 | 8/2001 | Lemelson et al. | |
| 6,480,789 B2 | 11/2002 | Lin | |
| 6,483,429 B1 | 11/2002 | Yasui et al. | |
| 6,487,481 B2 | 11/2002 | Tanaka et al. | |
| 6,487,500 B2 | 11/2002 | Lemelson et al. | |
| 7,057,532 B2 | 6/2006 | Shafir et al. | |
| 7,110,021 B2 | 9/2006 | Nobori et al. | |
| 7,149,648 B1 | 12/2006 | Hreha | |
| 7,158,015 B2 | 1/2007 | Rao et al. | |
| 7,248,153 B2 | 7/2007 | Danz et al. | |
| 2004/0048620 A1* | 3/2004 | Nakahara et al. | 455/456.1 |
| 2005/0017857 A1* | 1/2005 | Rao et al. | 340/435 |
| 2005/0065779 A1* | 3/2005 | Odinak | 704/201 |
| 2005/0137774 A1 | 6/2005 | Rupp | |
| 2006/0290482 A1* | 12/2006 | Matsumoto et al. | 340/436 |
| 2007/0009137 A1* | 1/2007 | Miyoshi et al. | 382/104 |

(Continued)

OTHER PUBLICATIONS

U.S. Appl. No. 12/081,350, titled "Vehicle Collision Avoidance System," Filed Apr. 15, 2008 with Applicant Edwards et al. (32 pages).

(Continued)

*Primary Examiner* — Helal A Algahaim
(74) *Attorney, Agent, or Firm* — Finnegan, Henderson, Farabow, Garrett & Dunner LLP

(57) ABSTRACT

A collision avoidance system for a machine is disclosed. The collision avoidance system has a first obstacle detection system. The first obstacle detection system is configured to detect a first obstacle and generate a corresponding first signal. Additionally, the collision avoidance system has an operator interface. The operator interface has a display configured to communicate visual information to an operator. In addition, the collision avoidance system has an interface module configured to detect a status of the machine and generate a corresponding second signal. The collision avoidance system also has a controller. The controller is in communication with the first obstacle detection system, the operator interface, and the interface module. The controller is configured to control the display to indicate a dangerous obstacle detection to the operator, based on the first and second signals. Additionally, the controller is configured to control the display to provide a dangerous obstacle warning to the operator, based on the first and second signals.

24 Claims, 11 Drawing Sheets

U.S. PATENT DOCUMENTS

| | | | |
|---|---|---|---|
| 2007/0099757 A1* | 5/2007 | Landes | 477/175 |
| 2007/0124030 A1* | 5/2007 | Mori et al. | 701/1 |
| 2007/0181513 A1* | 8/2007 | Ward | 211/59.2 |
| 2009/0259399 A1 | 10/2009 | Kotejoshyer et al. | |

OTHER PUBLICATIONS

PreView—Collision Warning, "Overview," (http://www.preco.com/PreView/), (visited Feb. 19, 2008) (1 page).

PreView—Models, "Models," (http://www.preco.com/PreView/Models/index.htm), (visited Feb. 19, 2008) (1 page).

PreView—Technology, "Technology," (http://www.preco.com/PreView/technology.htm), (visited Feb. 19, 2008) (1 page).

S.A.S.—Safety Alert Systems, "Overview," (http://www.preco.com/PreView/SAS/index.htm), (visited Feb. 19, 2008) (2 pages).

PreView—Standard, "Standard Preview," (http://www.preco.com/PreView/Models/Standard/index.htm), (visited Feb. 19, 2008) (1 page).

PreView—Standard—Applications, "Standard Preview—Applications," (http://www.preco.com/PreView/Models/Standard/Application.htm), (visited Feb. 19, 2008) (1 page).

PreView—Standard—Performance, "Standard Preview—Performance," (http://www.preco.com/PreView/Models/Standard/Performance.htm), (visited Feb. 19, 2008) (2 pages).

PreView—Standard—Performance, "Standard Preview—Specifications," (http://www.preco.com/PreView/Models/Standard/Specifications.htm), (visited Feb. 19, 2008) (2 pages).

"Standard PreView Operating Manual/Installation Guide," (http://www.preco.com/Documents/Instructions/PreView/pv-st-3708941b.pdf) (visited Feb. 19, 2008) (11 pages).

PreView—Heavy-Duty, "Heavy-Duty Preview," (http://www.preco.com/PreView/Models/Heavy-Duty/index.htm), (visited Feb. 19, 2008) (1 page).

PreView—Standard—Applications, "Heavy-Duty Applications," (http://www.preco.com/PreView/Models/Heavy-Duty/Application.htm), (visited Feb. 19, 2008) (1page).

PreView—Standard—Applications, "Heavy-Duty—Performance," (http://www.preco.com/PreView/Models/Heavy-Duty/Performance.htm), (visited Feb. 19, 2008) (2 pages).

PreView—Standard—Applications, "Heavy-Duty—Specifications," (http://www.preco.com/PreView/Models/Heavy-Duty/Specifications.htm), (visited Feb. 19, 2008) (2 pages).

"Heavy Duty Preview Operating Manual/Installation Guide," (http://www.preco.com/Documents/Instructions/PreView/pv-hd-3708711c.pdf), (visited Feb. 19, 2008) (18 pages).

Preco Vehicle Communication Systems, Case Study—Idaho Sand & Gravel, Idaho Concrete Company, "How S.A.S. Reduced Noise and Increased Safety," (http://www.preco.com/Documents/brochures/PV-CS-SAS-002__-.pdf), (Feb. 2006) (3 pages).

Preco Vehicle Communication Systems, Case Study—Environmental Earthworks, "How S.A.S. Improved Operator Awareness and Public Safety," (http://www.preco.com/Documents/brochures/PV-CS-SAS-001__-.pdf), (Oct. 2005) (3 pages).

Preco Vehicle Communication Systems, Preview, "Collision Warning Systems, " (http://www.preco.com/Documents/brochures/PV-FL-ONR-001__-.pdf), (Oct. 2005) (3 pages).

Preco Vehicle Communication Systems, Preview, "Collision Warning Systems, " (http://www.preco.com/Documents/brochures/PV-FL-OFF-001__-.pdf), (Oct. 2005) (3 pages).

Preco Vehicle Communication Systems, S.A.S., "Safety Alert Systems Preview," (http://www.preco.com/Documents/brochures/PV-FL-SAS-OFF-001__-.pdf), (Feb. 2006) (3 pages).

Preco Vehicle Communication Systems, Press Release, "Preco Supplies Advanced Object Sensor for Safety Braking Systems," (http://www.preco.com/Documents/brochures/Press-Preco__MICO__092505.pdf), (Sep. 25, 2005) (2 pages).

* cited by examiner

VEHICLE COLLISION AVOIDANCE SYSTEM

TECHNICAL FIELD

The present disclosure relates generally to a collision avoidance system and, more particularly, to a system for avoiding vehicle collisions.

BACKGROUND

Large machines such as, for example, wheel loaders, off-highway haul trucks, excavators, motor graders, and other types of earth-moving machines are used to perform a variety of tasks. Some of these tasks involve intermittently moving between and stopping at certain locations within a worksite and, because of the poor visibility provided to operators of the machines, these tasks can be difficult to complete safely and effectively. In fact, it is not uncommon for obstacles, such as light duty vehicles, to move and stop near the machine completely unnoticed by the operator. When an obstacle remains unnoticed, the machine may move toward and collide with the obstacle. This collision may necessitate an accident investigation. During this accident investigation, the machine may be taken out of service, thereby reducing the productivity and efficiency of the worksite.

One way to minimize the effect of obstacles near a machine is described in U.S. Pat. No. 7,158,015 (the '015 patent) issued to Rao et al. on Jan. 2, 2007. The '015 patent describes a vehicle that includes multiple vision sensing systems. The vision sensing systems have vision receivers and generate an object detection signal. The '015 patent also describes a controller that includes a plurality of sensing system aid modules. The sensing system aid modules correspond to each of the vision sensing systems. The controller operates the sensing system aid modules in response to a vehicle parameter, and generates a safety system signal in response to the object detection signal. The sensing system aid modules have associated operating modes and operate the vision sensing systems in the operating modes in response to the vehicle parameter. Operating modes include adaptive cruise control mode, parking-aid mode, reversing-aid mode, pre-collision sensing mode, lane departure aid mode, and lane-keeping aid mode. The controller indicates the safety system signal via an indicator.

Although the system aid modules of the '015 patent may operate the vision sensing systems of the '015 patent to detect objects, the vision sensing systems may do little to detect objects when operated in certain operating modes, in response to a vehicle parameter. As a result of these non-detections, the indicator of the '015 patent may fail to indicate relevant safety system signals. For example, when a reverse gear of the vehicle of the '015 patent is not engaged, the controller of the '015 patent does not operate a reversing-aid mode. When the reversing-aid mode is not operated, objects rearward and within approximately 2-5 meters of the vehicle are not detected or indicated. But, an operator may find these objects relevant to a possible collision situation. For example, when the reverse gear is not engaged, a neutral gear may be engaged. When the neutral gear is engaged, the vehicle may roll in the rearward direction and collide with obstacles within approximately 2-5 meters of the vehicle. Moreover, though the indicator may fail to indicate relevant safety system signals, it may indicate extraneous safety system signals. In particular, the indicator may indicate safety system signals that are not relevant to certain vehicle movements. For example, when the reverse gear of the vehicle is engaged, the controller operates a forward vision system in pre-collision mode. When the forward vision system operates in pre-collision mode, objects forward of the vehicle are detected and indicated. But, these detections and indications may confuse or annoy the operator, thereby reducing the indicator's future effectiveness.

The disclosed system is directed to overcoming one or more of the problems set forth above.

SUMMARY

In one aspect, the present disclosure is directed to a collision avoidance system for a machine. The collision avoidance system includes a first obstacle detection system. The first obstacle detection system is configured to detect a first obstacle and generate a corresponding first signal. Additionally, the collision avoidance system includes an operator interface. The operator interface includes a display configured to communicate visual information to an operator. In addition, the collision avoidance system includes an interface module configured to detect a status of the machine and generate a corresponding second signal. The collision avoidance system also includes a controller. The controller is in communication with the first obstacle detection system, the operator interface, and the interface module. The controller is configured to control the display to indicate a dangerous obstacle detection to the operator, based on the first and second signals. Additionally, the controller is configured to control the display to provide a dangerous obstacle warning to the operator, based on the first and second signals.

In another aspect, the present disclosure is directed to a method of responding to a potential machine collision. The method includes detecting a first obstacle. Additionally, the method includes detecting a status of the machine. The method also includes indicating a dangerous obstacle detection to an operator, based on the detection of the first obstacle and the detection of the status of the machine. In addition, the method includes providing a dangerous obstacle warning to the operator, based on the detection of the first obstacle and the detection of the status of the machine.

DETAILED DESCRIPTION

Figure 1:
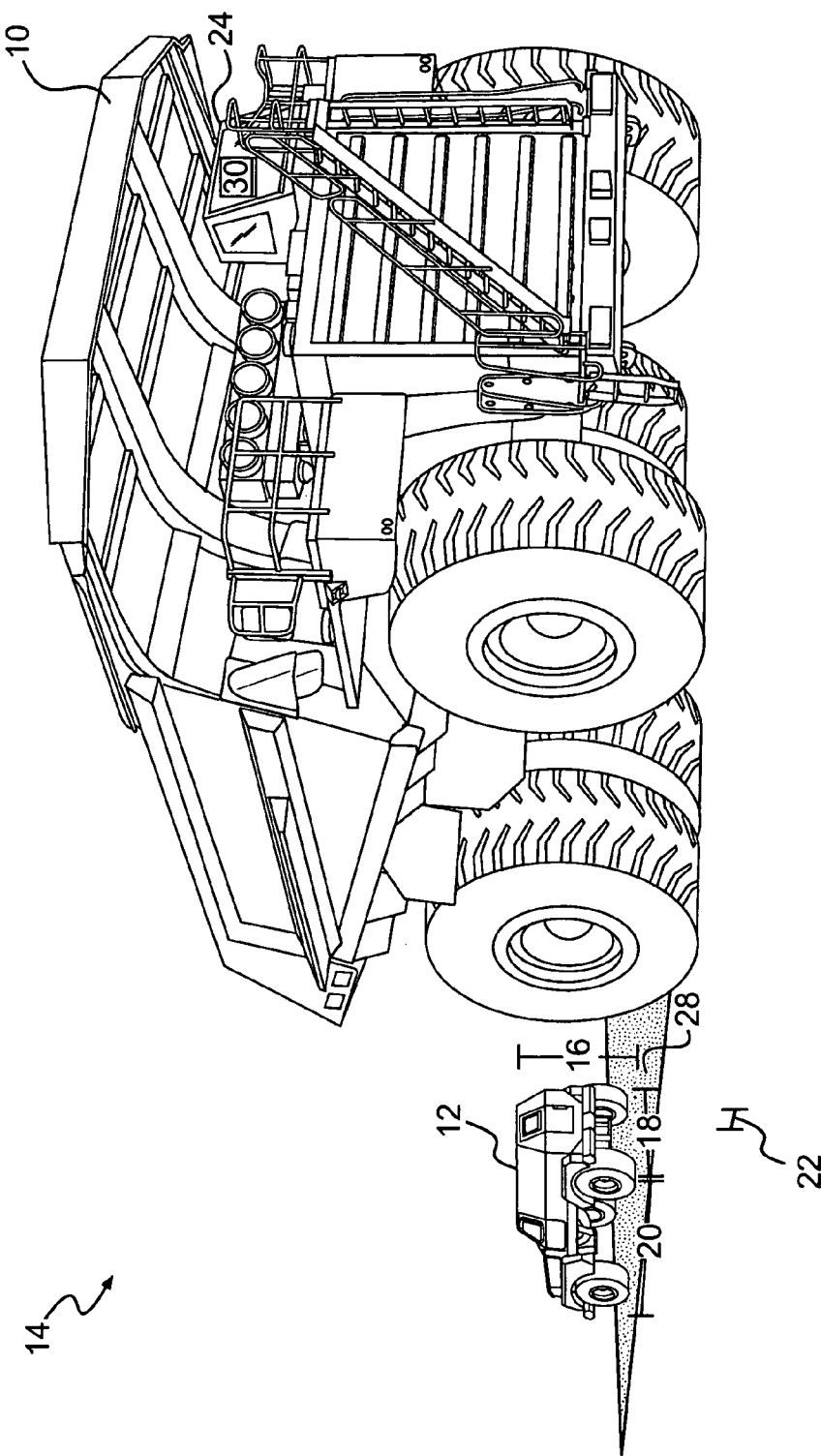
FIG. 1 is a pictorial illustration of an exemplary disclosed machine.

FIG. 1 illustrates an exemplary machine 10 and an obstacle 12 of machine 10, both located at a worksite 14. Although machine 10 is depicted as an off-highway haul truck, it is contemplated that machine 10 may embody another type of large machine, for example, a wheel loader, an excavator, or a motor grader. Obstacle 12 is depicted as a service vehicle. But, it is contemplated that obstacle 12 may embody another type of obstacle, for example, a pick-up truck, or a passenger car. If obstacle 12 is at least a certain size, obstacle 12 may be classified as dangerous. For example, the certain size may be a length 22. If obstacle 12 has a height 16 longer than a length 22, a width 18 longer than length 22, or a depth 20 longer than length 22, obstacle 12 may be classified as dangerous. Alternatively, obstacle 12 may be classified as dangerous for another reason. For example, obstacle 12 may be classified as dangerous if it has a stable RADAR return (i.e. if it is detected at one range for more than a certain period of time). Worksite 14 may be, for example, a mine site, a landfill, a quarry, a construction site, or another type of worksite known in the art.

Machine 10 may have an operator station 24, which may be situated to minimize the effect of blind spots of machine 10 (i.e. maximize the unobstructed area viewable by an operator or operators of machine 10 (hereafter "operator")). But, because of the size of some machines, these blind spots may still be large. For example, dangerous obstacle 12 may reside completely within a blind spot 28, which may or may not be viewable by the operator. To avoid collisions with dangerous obstacle 12, machine 10 may be equipped with a collision avoidance system 29 (referring to FIG. 2). Collision avoidance system 29 may include a controller 30 to gather information about obstacle 12 within blind spot 28.

Figure 2:
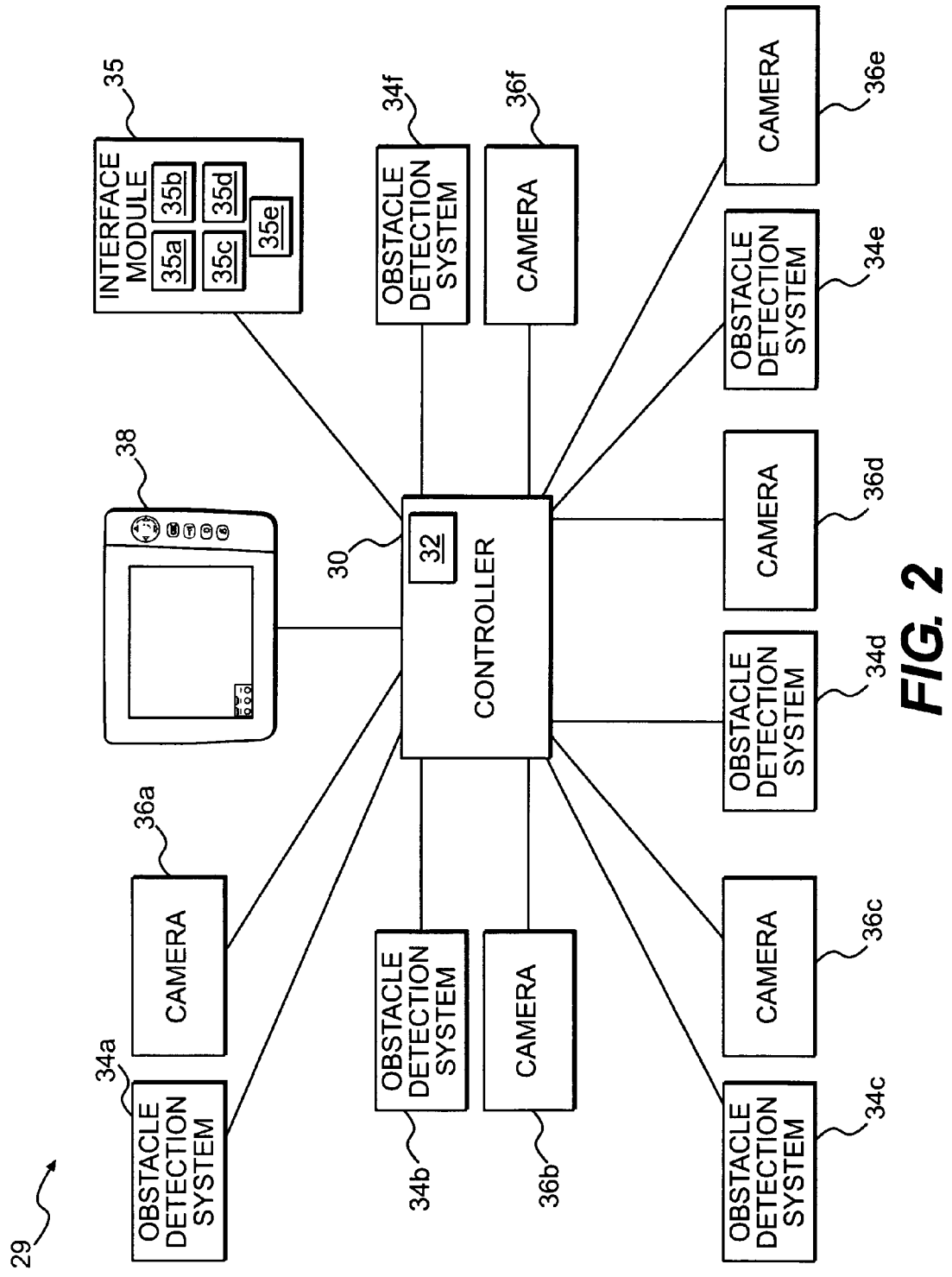
FIG. 2 is a diagrammatic illustration of an exemplary disclosed control system for use with the machine of FIG. 1.

Controller 30 may be associated with operator station 24, or another protected assembly of machine 10. As illustrated in FIG. 2, controller 30 may include a map 32 to store information about dangerous obstacle 12 detections within blind spot 28. Controller 30 may update map 32 to reflect current dangerous obstacle 12 detections by communicating with an obstacle detection system 34. Controller 30 may also communicate with an interface module 35 to detect a status of machine 10. Additionally, controller 30 may communicate with a camera 36 to capture images of blind spot 28. Controller 30 may communicate these images to the operator via an operator interface 38, which may operate in one of a plurality of color schemes based on the machine status. In addition, controller 30 may use operator interface 38 to communicate a visual representation of map 32 to the operator, thereby indicating a dangerous obstacle 12 detection to the operator. Controller 30 may also use operator interface 38 to provide a dangerous obstacle 12 warning to the operator, and acknowledge the operator's recognition of this warning.

Controller 30 may include means for monitoring, recording, storing, indexing, processing, and/or communicating information. These means may include, for example, a memory, one or more data storage devices, a central processing unit, and/or another component that may be used to run the disclosed applications. Furthermore, although aspects of the present disclosure may be described generally as being stored in memory, one skilled in the art will appreciate that these aspects can be stored on or read from different types of computer program products or computer-readable media such as computer chips and secondary storage devices, including hard disks, floppy disks, optical media, CD-ROM, or other forms of RAM or ROM.

Interface module 35 may include a plurality of sensors 35a-e distributed throughout machine 10 and configured to gather data from various components and subsystems of machine 10. Sensors 35a-e may be associated with and/or monitor a power source, a transmission, a traction device, a steering device, and/or other components and subsystems of machine 10. Sensors 35a-e may measure and/or detect a status of machine 10 based on the gathered data, such as, for example, a ground speed, a distance traveled, a gear selection of the transmission, a steering angle, or an ambient light level. Interface module 35 may be configured to generate and communicate to controller 30 a signal corresponding to this status of machine 10.

Figure 3:
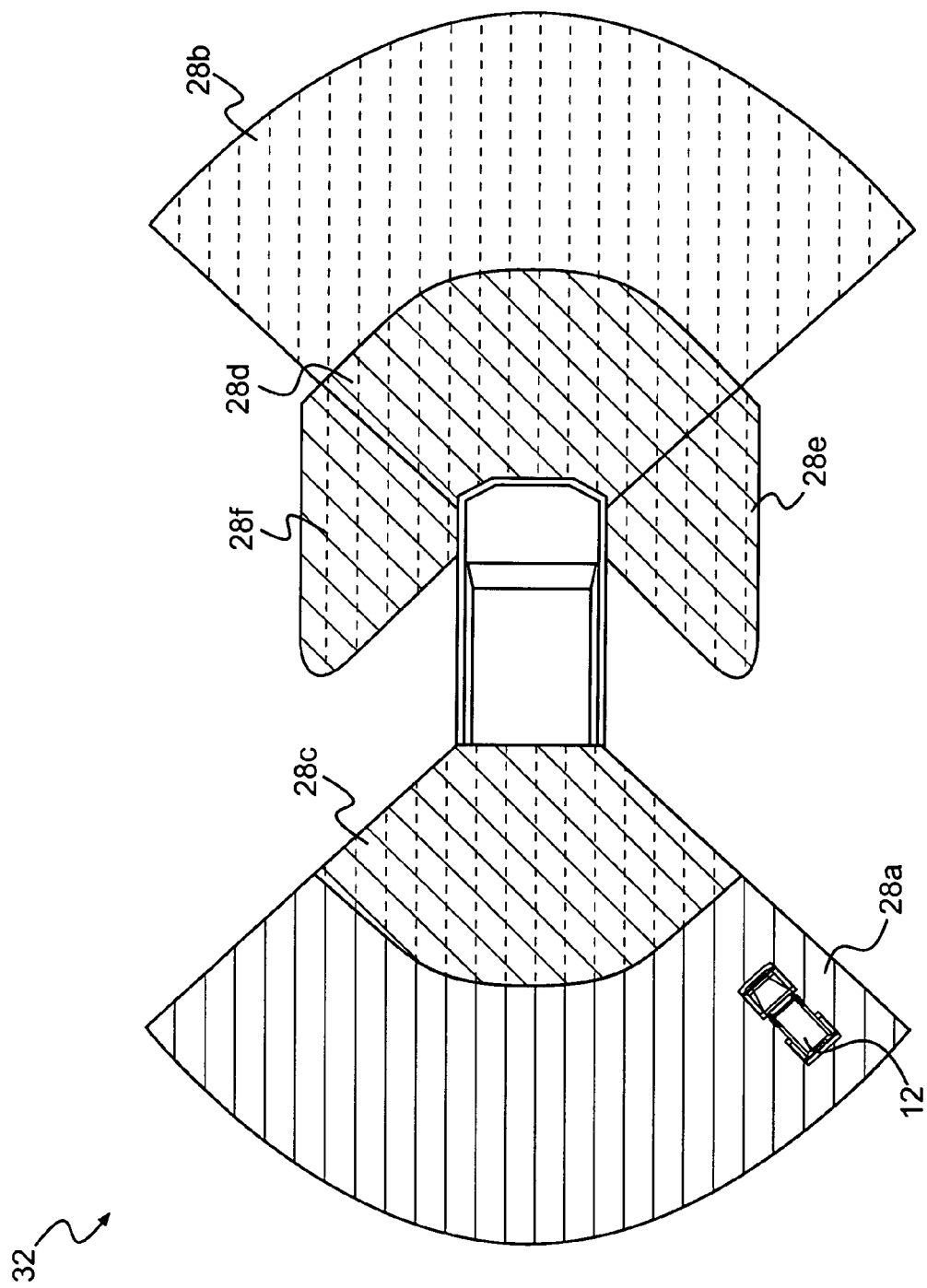
FIG. 3 is a pictorial illustration of an exemplary disclosed map for use with the control system of FIG. 2.

Map 32 may be electronic in form, and may be stored in the memory of controller 30. As previously discussed, map 32 may be updated in real time to reflect current dangerous obstacle 12 detections. It is contemplated that map 32 may store a set of detection values representing dangerous obstacle 12 detections within one or more blind spots 28. It is further contemplated that map 32 may be visually represented. For example, as illustrated in FIG. 3, the set of detection values may represent dangerous obstacle 12 detections within each of blind spots 28a, 28b, 28c, 28d, 28e, and 28f. Blind spot 28d may be located forward of machine 10, while blind spot 28c may be located rearward of machine 10. And, blind spot 28f may be located leftward of machine 10, while blind spot 28e may be located rightward of machine 10. It is also contemplated that map 32 may store a set of criticality values representing how threatening dangerous obstacle 12 within each of blind spots 28a, 28b, 28c, 28d, 28e, and 28f may be. For example, dangerous obstacle 12 within blind spots 28c, 28d, 28e, and 28f may be more threatening than dangerous obstacle 12 within blinds spots 28a and 28b because blind spots 28c, 28d, 28e, and 28f may be closer to machine 10. Table 1 represents a possible set of detection values and a possible set of criticality values as stored in controller 30.

TABLE 1

| Blind Spot | Detection Value | Criticality Value |
|---|---|---|
| 28a | 1 | 0 |
| 28b | 0 | 0 |
| 28c | 0 | 1 |
| 28d | 0 | 1 |
| 28e | 0 | 1 |
| 28f | 0 | 1 |

Both detection values and criticality values may be binary. For example, detection value 1 may correspond to a dangerous obstacle 12 detection (i.e. dangerous obstacle 12 presence), while detection value 0 may correspond to a dangerous obstacle 12 non-detection (i.e. dangerous obstacle 12 absence). And, criticality value 1 may correspond to a blind spot 28 within which obstacle 12 is threatening, while criticality value 0 may correspond to a blind spot 28 within which obstacle 12 is not threatening. In FIG. 3, detection value 1 is represented by horizontal solid-line crosshatching, while detection value 0 is represented by horizontal dotted-line crosshatching. And, criticality value 1 is represented by diagonal solid-line crosshatching, while criticality value 0 is represented by the absence of diagonal crosshatching.

Each blind spot 28 may be associated with one obstacle detection system 34, which may detect dangerous obstacle 12 and, through communication with controller 30, update map 32 accordingly. Each blind spot 28 may also be associated with one camera 36, which may capture images of blind spot 28 and, via operator interface 38, display these images to the operator. Table 2 represents one possible set of associations between blind spots 28, obstacle detection systems 34, and cameras 36. Each row of Table 2 represents a 3-way association between one blind spot 28, one obstacle detection system 34, and one camera 36.

TABLE 2

| Blind Spot | Obstacle Detection System | Camera |
|---|---|---|
| 28a | 34a | 36a |
| 28b | 34b | 36b |
| 28c | 34c | 36c |
| 28d | 34d | 36d |
| 28e | 34e | 36e |
| 28f | 34f | 36f |

Alternatively, each blind spot 28 may be associated with more than one obstacle detection system 34 and/or more than one camera 36. In yet another alternative, more than one blind spot 28 may share one camera 36 and/or one obstacle detection system 34. For example, blind spots 28a and 28c may share one camera 36. This camera 36 may hereafter be referred to as camera 36a or camera 36c. Additionally, blind spots 28b and 28d may share one camera 36. This camera 36 may hereafter be referred to as camera 36b or camera 36d.

Figure 4:
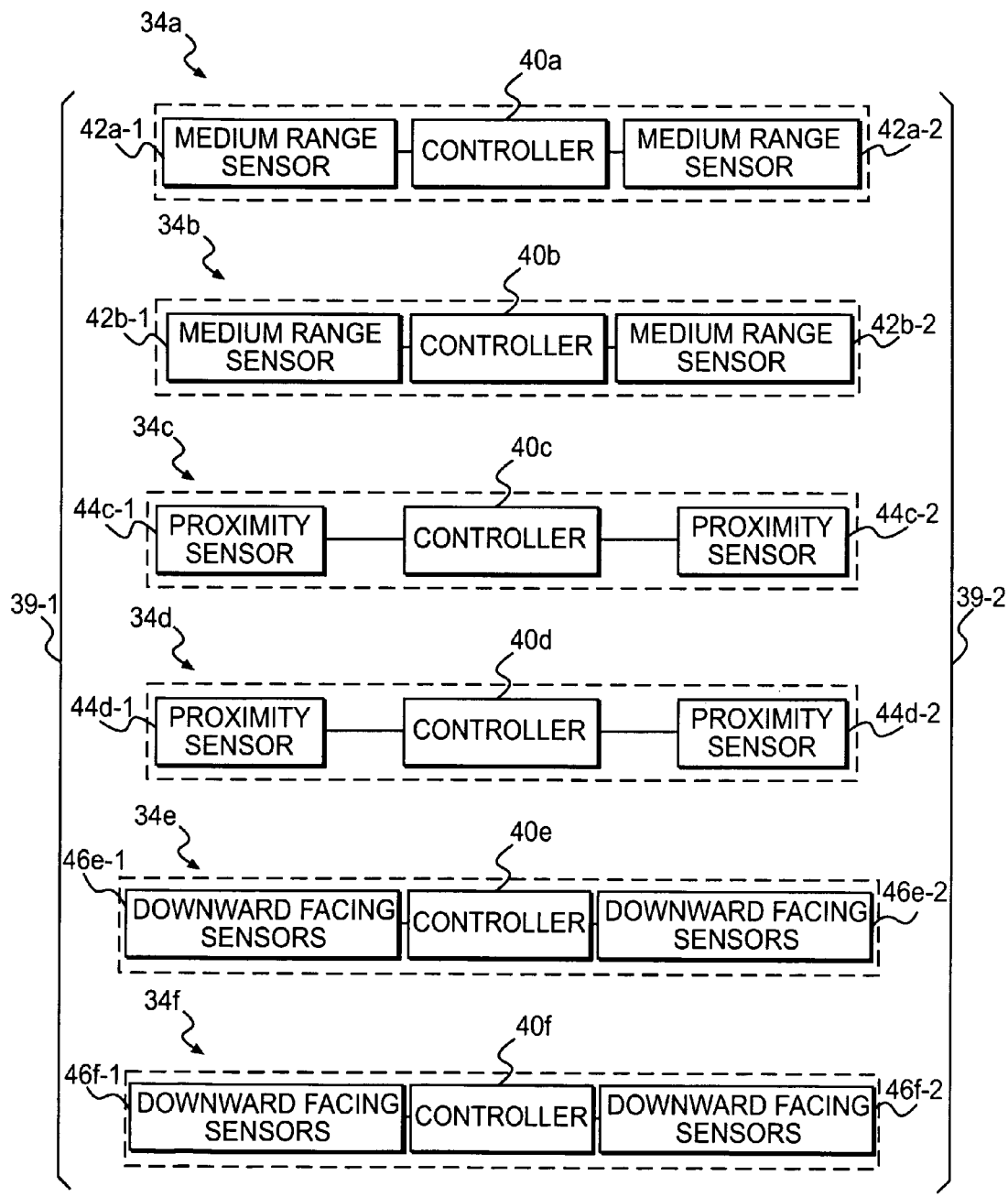
FIG. 4 is a diagrammatic illustration of exemplary disclosed obstacle detection systems for use with the control system of FIG. 2.

Referring to FIG. 4, each obstacle detection system 34 may include an obstacle sensor 39, or a plurality thereof, to detect points on surfaces within its associated blind spot 28. For example, obstacle detection system 34 may include a first obstacle sensor 39-1 and a second obstacle sensor 39-2. Obstacle sensor 39-1 may detect points that are on surfaces facing it (i.e. points within a line of sight of obstacle sensor 39-1). And, obstacle sensor 39-2 may detect points that are on surfaces facing it (i.e. points within a line of sight of obstacle sensor 39-2). Detections of points by obstacle sensors 39-1 and 39-2 may be raw (i.e. not directly comparable). Therefore, each obstacle detection system 34 may also include a controller 40, which may receive communications including the detections of points from obstacle sensors 39-1 and 39-2 (i.e. obstacle 12 detections), respectively, and then transform, filter, and/or unionize the detections. Each controller 40 may also generate and communicate to controller 30 a signal corresponding to these transformed, filtered, and/or unionized detections (i.e. dangerous obstacle 12 detections). Alternatively, it is contemplated that each obstacle detection system 34 may embody a single integrated component that may detect obstacles 12, determine whether obstacles 12 are dangerous, and communicate dangerous obstacle 12 detections to controller 30. For example, obstacle detection system 34 may embody a motion detector, an RFID detector, or a GPS tracking system.

It is contemplated that obstacle sensors 39 may vary in form. For example, each obstacle sensor 39 may embody a medium range sensor 42, a proximity sensor 44, a downward facing sensor 46, or another sensor that may detect points on surfaces. Table 3 represents exemplary configurations of each obstacle detection system 34.

TABLE 3

| Obstacle Detection System | Controller | Medium Range Sensor(s) | Proximity Sensor(s) | Downward Facing Sensor(s) |
|---|---|---|---|---|
| 34a | 40a | 42a-1 and 42a-2 | None | None |
| 34b | 40b | 42b-1 and 42b-2 | None | None |
| 34c | 40c | None | 44c-1 and 44c-2 | None |
| 34d | 40d | None | 44d-1 and 44d-2 | None |
| 34e | 40e | None | None | 46e-1 and 46e-2 |
| 34f | 40f | None | None | 46f-1 and 46f-2 |

Figure 5:
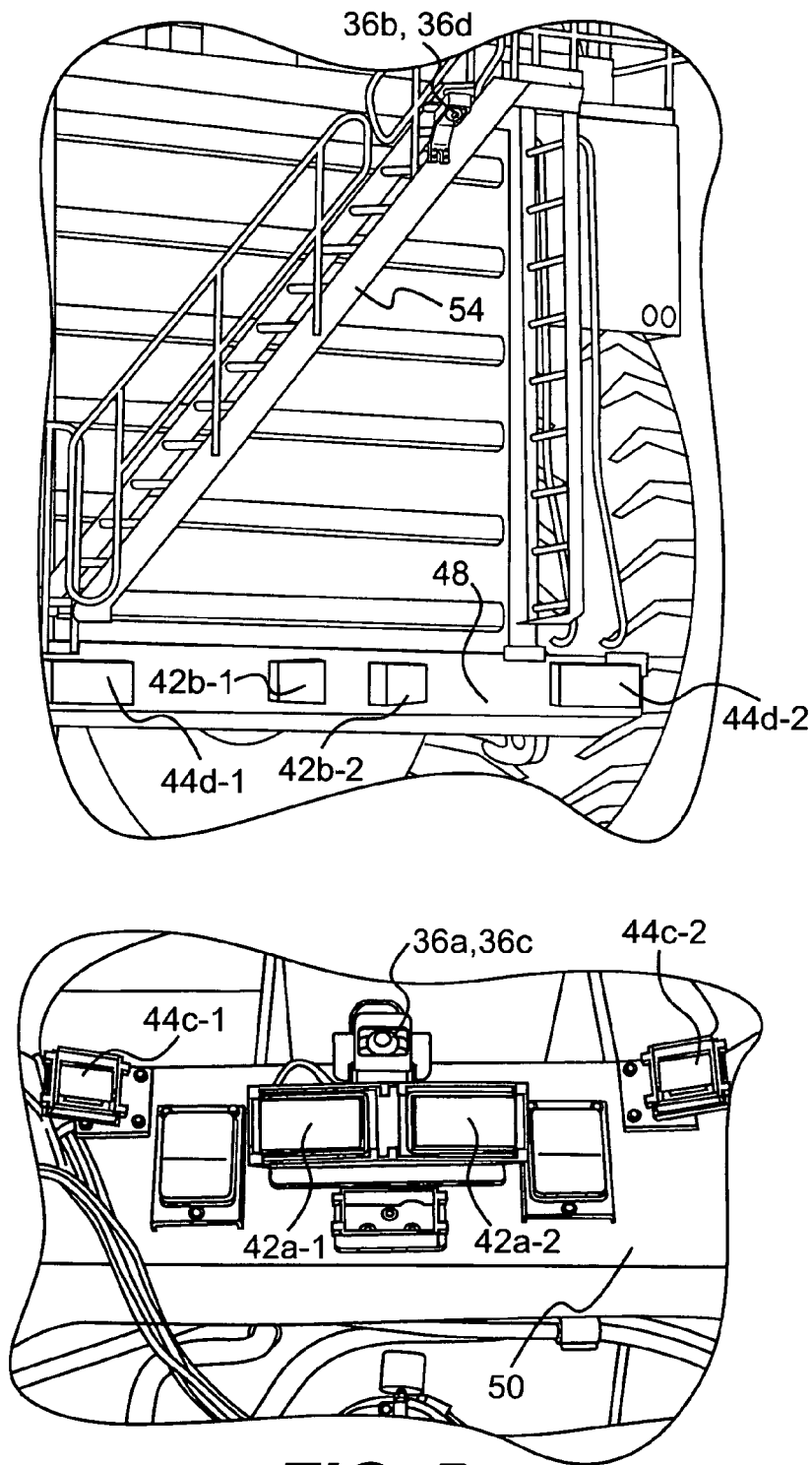
FIG. 5 is a pictorial illustration of exemplary disclosed medium range sensors, exemplary disclosed proximity sensors, and exemplary disclosed cameras for use with the obstacle detection systems of FIG. 4.

As illustrated in FIG. 5, medium range sensors 42b-1 and 42b-2 may be attached to a bumper 48 of machine 10, and situated to detect obstacle 12 within blind spot 28b. And, medium range sensors 42a-1 and 42a-2 may be attached to a rear support 50 of machine 10, and situated to detect obstacle 12 within blind spot 28a. Each medium range sensor 42 may embody a device that detects and ranges (i.e. determines relative locations of) surface points. For example, each medium range sensor 42 may be a LIDAR (light detection and ranging) device, RADAR (radio detection and ranging) device, SONAR (sound navigation and ranging) device, vision based sensing device, or another type of device that may detect and range surface points. Medium range sensors 42 may be configured to detect and range surface points that are between approximately 5 and 20 meters from machine 10. And, medium range sensors 42 may also be configured to generate and communicate to controllers 40 signals corresponding to these detections.

Also illustrated in FIG. 5, proximity sensors 44c-1 and 44c-2 may be attached to rear support 50 of machine 10, and situated to detect obstacle 12 within blind spot 28c. And, proximity sensors 44d-1 and 44d-2 may be attached to bumper 48 of machine 10, and situated to detect obstacle 12 within blind spot 28d. Each proximity sensor 44 may embody a device that detects and ranges (i.e. determines relative locations of) surface points. For example, each proximity sensor 44 may be a LIDAR (light detection and ranging) device, RADAR (radio detection and ranging) device, SONAR (sound navigation and ranging) device, vision based sensing device, or another type of device that may detect and range surface points. Proximity sensors 44 may be configured to detect and range surface points that are within approximately 5 meters of machine 10. And, proximity sensors 44 may also be configured to generate and communicate to controllers 40 signals corresponding to these detections.

Figure 6:
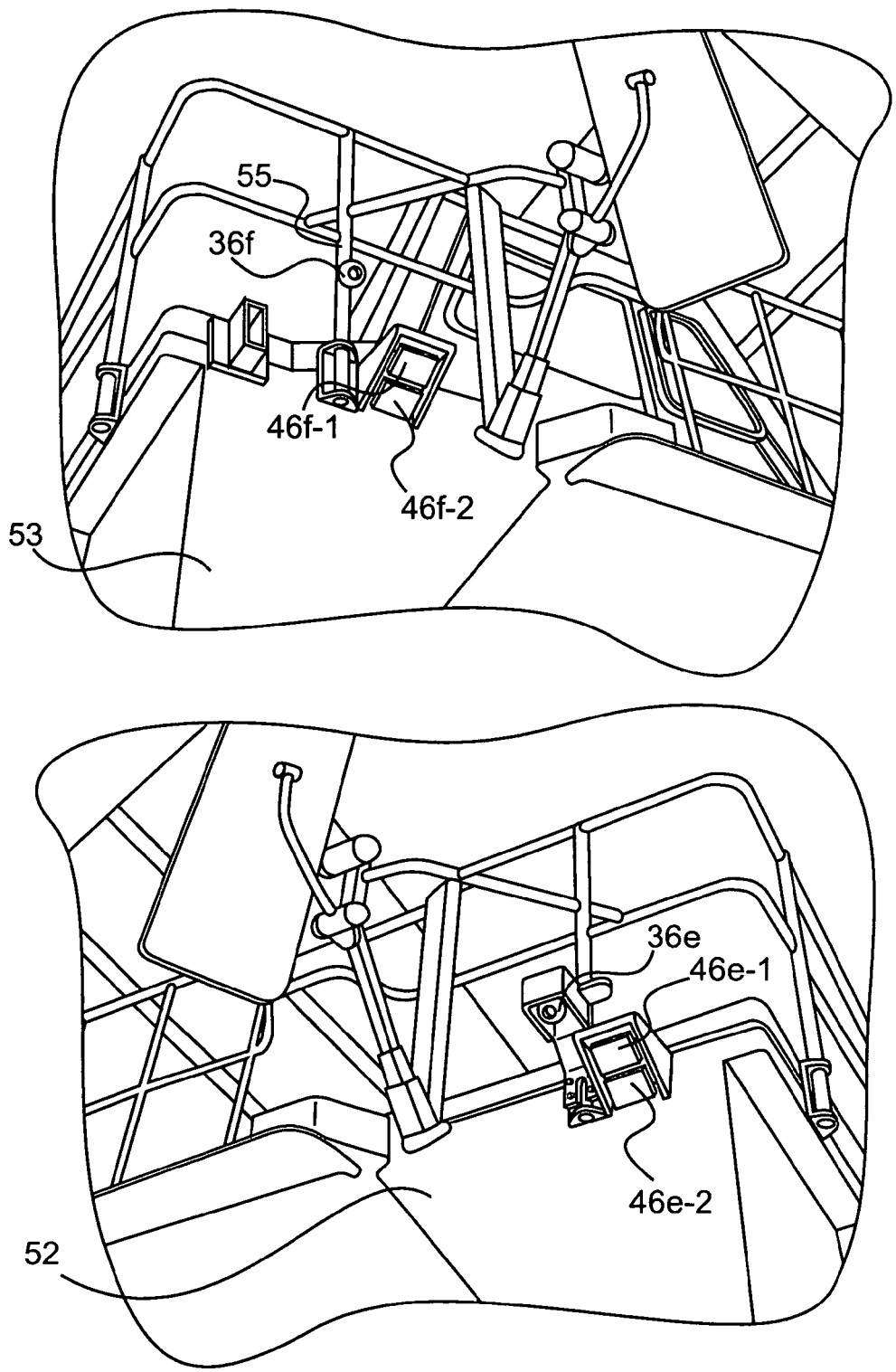
FIG. 6 is a pictorial illustration of exemplary disclosed downward facing sensors and exemplary disclosed cameras for use with the obstacle detection systems of FIG. 4.

As illustrated in FIG. 6, downward facing sensors 46e-1 and 46e-2 may be attached to a quarter panel 52 of machine 10, and situated to detect obstacle 12 within blind spot 28e. And, downward facing sensors 46f-1 and 46f-2 may be attached to a quarter panel 53 of machine 10, and situated to detect obstacle 12 within blind spot 28f. Each downward facing sensor 46 may embody a device that detects and ranges (i.e. determines relative locations of) surface points. For example, each downward facing sensor 46 may be a LIDAR (light detection and ranging) device, RADAR (radio detection and ranging) device, SONAR (sound navigation and ranging) device, vision based sensing device, or another type of device that may detect and range surface points. Downward facing sensors 46 may be configured to detect and range surface points that are within approximately 5 meters of machine 10. These surface points may include ground surface points. And, downward facing sensors 46 may also be configured to generate and communicate to controllers 40 signals corresponding to these detections.

Each controller 40 may include means for monitoring, recording, storing, indexing, processing, and/or communicating information. These means may include, for example, a memory, one or more data storage devices, a central processing unit, and/or another component that may receive surface point detections from obstacle sensors 39, and then communicate a signal indicative of dangerous obstacle 12 detections to controller 30.

As previously discussed, each blind spot 28 may also be associated with one camera 36, which may capture images of dangerous obstacle 12. For example, each camera 36 may embody a video camera, or another device operable to capture, and communicate images. Referring to FIG. 5, camera 36b (alternatively referred to as camera 36d) may be mounted on stairs 54 to view blind spots 28b and 28d, and camera 36a (alternatively referred to as camera 36c) may be mounted on rear support 50 to view blind spots 28a and 28c. Additionally, referring to FIG. 6, camera 36e may be mounted on quarter panel 52 to view blind spot 28e. And, camera 36f may be mounted on railing 55 to view blind spot 28f. Each camera 36 may generate and communicate to controller 30 a signal corresponding to captured images. It is contemplated that controller 30 may communicate with operator interface 38 to display these captured images to the operator.

Figure 7:
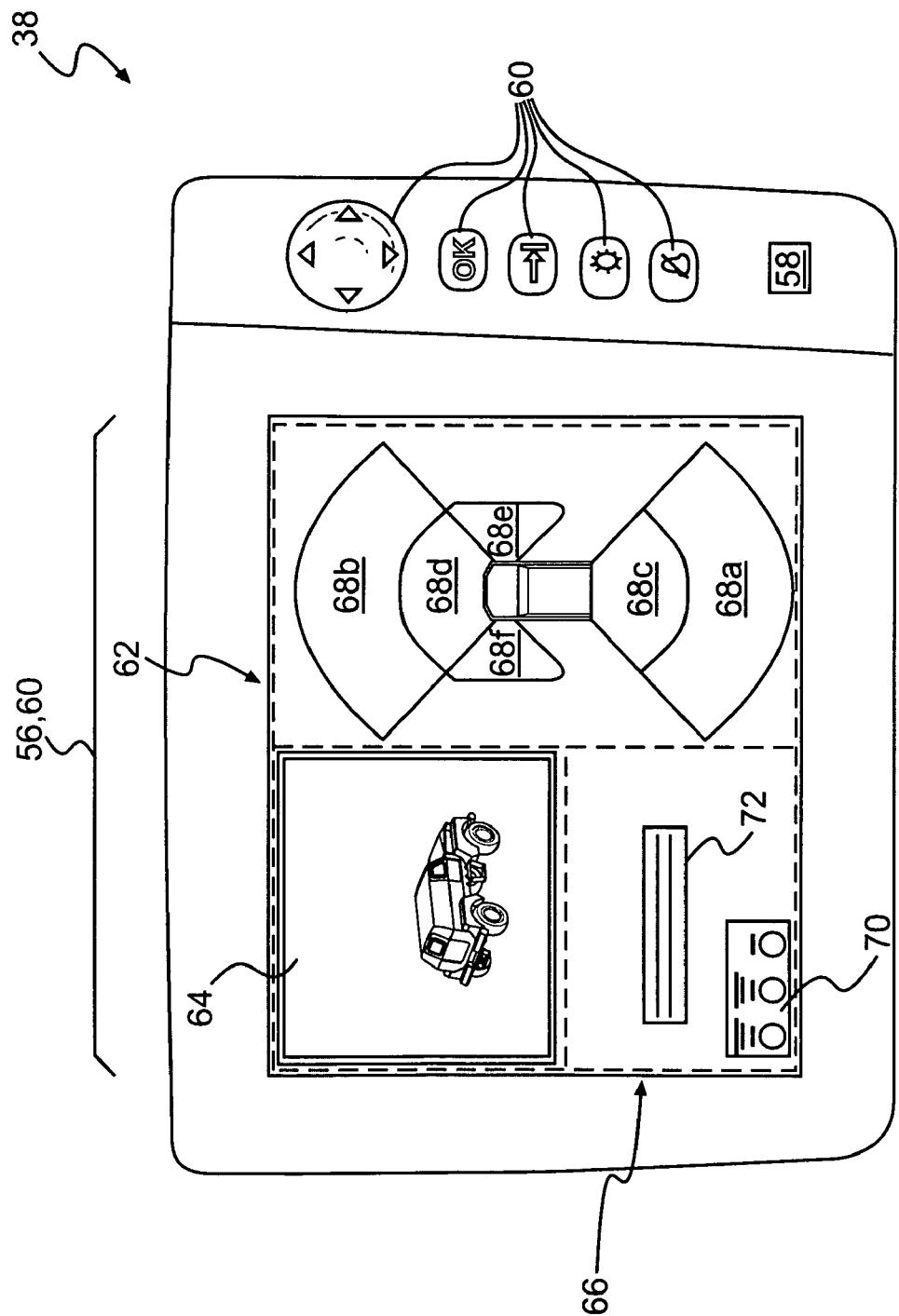
FIG. 7 is a pictorial illustration of an exemplary disclosed operator interface operating in an exemplary disclosed mixed mode in an exemplary disclosed active color scheme, for use with the control system of FIG. 2.

Operator interface 38 may be situated within operator station 24 (referring to FIG. 1) and may be viewable, and operable by the operator. For example, operator interface 38 may be mounted to a dashboard (not shown) of machine 10 within reach of the operator. As illustrated in FIG. 7, operator interface 38 may include a display 56 to display the captured images. Display 56 may also display a visual representation of map 32. Controller 30 may use this visual representation of map 32 to provide a dangerous obstacle 12 warning to the operator. Alternatively or additionally, operator interface 38 may include a warning device 58 to provide a dangerous obstacle 12 warning to the operator. Warning device 58 may embody, for example, an alarm; a horn; an odorant or tissue-irritating substance dispenser; or another device operable to provide a warning to the operator. Operator interface 38 may also include an input device 60 to receive a selection from the operator. This selection may serve to acknowledge the operator's recognition of a provided dangerous obstacle 12 warning. Input device 60 may embody, for example a rocker switch, a hat switch, a joystick, a button, and/or another device capable of receiving a selection from the operator and generating a corresponding signal. Alternatively, display 56 and input device 60 may together embody a single integral component such as, for example, a touch-screen.

Display 56 may embody, for example, a monitor, an LCD screen, a plasma screen, a screen of a handheld device, or another device capable of communicating visual information to the operator. It is contemplated that controller 30 may operate display 56 in one or more modes corresponding to varied machine 10 operations. For example, a mixed mode may be utilized during normal operations to provide to the operator a wide breadth of information. When dangerous obstacle 12 is detected within a certain blind spot 28, a camera mode may be utilized to provide to the operator focused information regarding that certain blind spot 28. The operator may activate camera mode in response to a provided dangerous obstacle 12 warning, thereby acknowledging the dangerous obstacle 12 warning.

FIG. 7 illustrates display 56 operating in mixed mode. In mixed mode, controller 30 may devote a first portion 62 of display 56 to the visual representation of map 32. Controller 30 may devote a second portion 64 of display 56 to images captured by one camera 36 (hereafter "camera 36 images"). And, controller 30 may devote a third portion 66 of display 56 to collision avoidance system 29 status information.

Portion 62 may operate in one of a plurality of color schemes/modes based upon the status communicated by interface module 35. For example, portion 62 may operate in one of a night, a day, and a sleep color scheme based on the statuses/thresholds defined by Table 4.

TABLE 4

| Distance Traveled Since Last Full Stop | Ground Speed | Ambient Light Level | Color Scheme |
|---|---|---|---|
| More than 20 Meters | Any Speed Except 0 MPH | Any | Sleep |
| More than 20 Meters | 0 MPH | Low | Night |
| More than 20 Meters | 0 MPH | High | Day |
| Less than 20 Meters | Any Speed | Low | Night |
| Less than 20 Meters | Any Speed | High | Day |

It is contemplated that these color schemes may highlight or suppress dangerous obstacle 12 detections. Specifically, the night and day color schemes (hereafter an "active" color scheme) may highlight dangerous obstacle 12 detections, while the sleep color scheme (hereafter an "inactive" color scheme) may suppress dangerous obstacle 12 detections.

When the color scheme of portion 62 is active, portion 62 may include icons 68a, 68b, 68c, 68d, 68e, and 68f, arranged and sized to represent blind spots 28a, 28b, 28c, 28d, 28e, and 28f, respectively. Controller 30 may vary the appearance of each icon 68 to indicate dangerous obstacle 12 detections within an associated blind spot 28, thereby highlighting these dangerous obstacle 12 detections. For example, controller 30 may change the color of icons 68. It is contemplated that controller 30 may also vary this color depending on the criticality of blind spot 28. Additionally, controller 30 may alter the appearance of each icon 68 to provide a dangerous obstacle 12 warning to the operator. For example, controller 30 may cause icons 68 to flash intermittently between two different colors. The appearance of each icon 68 may be defined by Table 5.

TABLE 5

| | | Dangerous Obstacle not Detected | Dangerous Obstacle Detected within Blind Spot | |
|---|---|---|---|---|
| | | within Blind Spot | Warning | No Warning |
| Night Color Scheme | Threatening | Black | Black/Blue | Blue |
| | Non-Threatening | Black | Not Applicable | Green |

TABLE 5-continued

| | | Dangerous Obstacle not Detected | Dangerous Obstacle Detected within Blind Spot | |
|---|---|---|---|---|
| | | within Blind Spot | Warning | No Warning |
| Day Color Scheme | Threatening | Black | Black/Red | Red |
| | Non-Threatening | Black | Not Applicable | Yellow |

Figure 8:
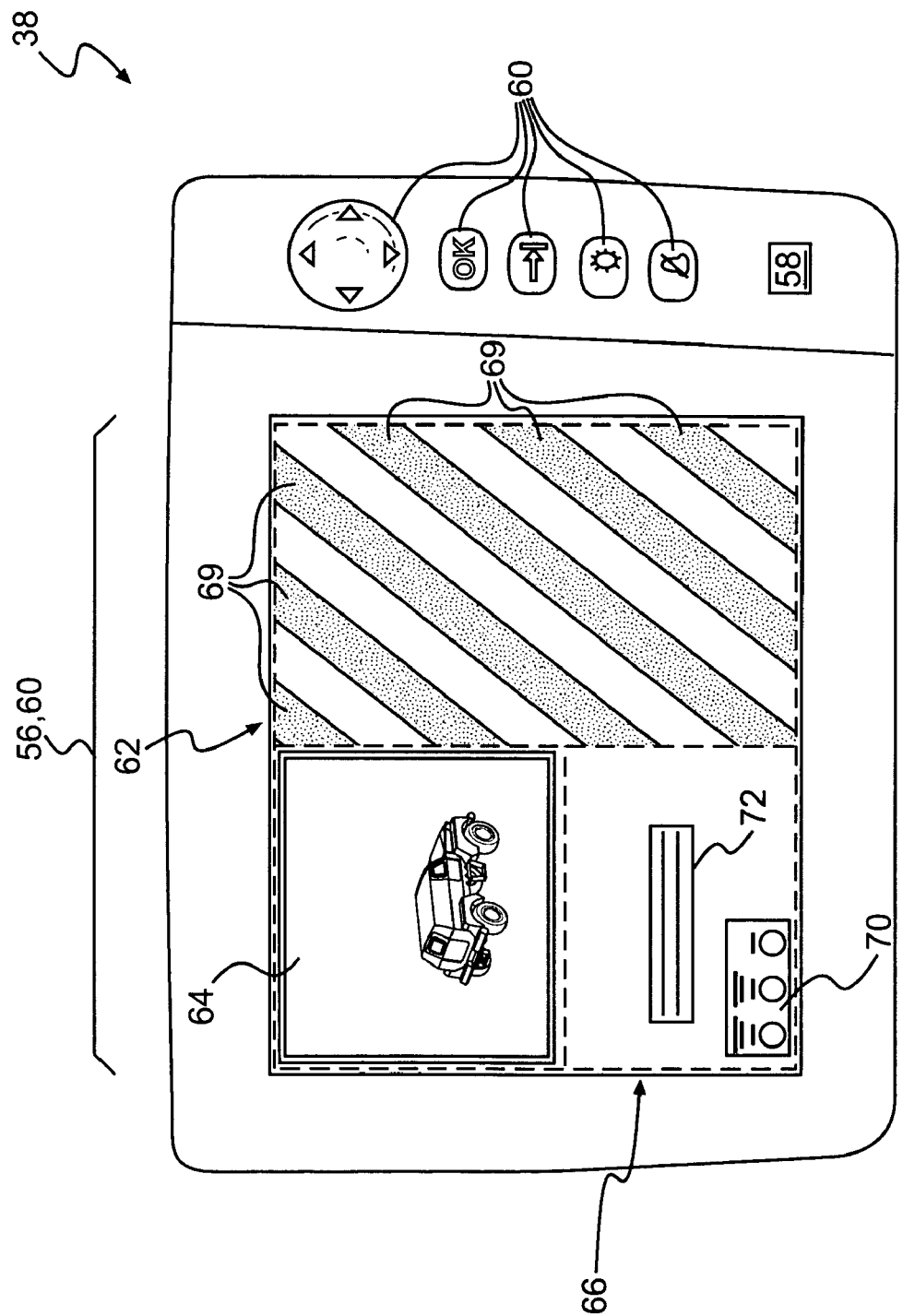
FIG. 8 is a pictorial illustration of the operator interface of FIG. 7 operating in the mixed mode of FIG. 7 in an exemplary disclosed inactive color scheme.

When the color scheme of portion 62 is inactive, as illustrated in FIG. 8, portion 62 may in no way communicate dangerous obstacle 12 detections to the operator, thereby suppressing these dangerous obstacle 12 detections. For example, portion 62 may include diagonal lines 69, but controller 30 may not vary the appearance of diagonal lines 69 in response to dangerous obstacle 12 detections.

As previously discussed, portion 64 may be devoted to camera 36 images. Specifically, portion 64 may communicate camera 36 images. It is contemplated that controller 30 may automatically select which camera 36 images are communicated (i.e. controller 30 may automatically determine which camera 36 captures the images that are displayed). This automatic selection may be based on the status communicated by interface module 35. For example, controller 30 may select which camera 36 images are displayed based on which blind spot 28 machine 10 may be capable of moving toward. Table 6 defines one possible set of relations between statuses and selected cameras.

TABLE 6

| Steering Angle | Gear Selected | Camera |
|---|---|---|
| Leftward | Forward | 36f |
| Leftward | Reverse | 36e |
| Rightward | Forward | 36e |
| Rightward | Reverse | 36f |
| Neutral (i.e., neither Rightward nor Leftward) | Forward | 36d |
| Neutral | Reverse | 36c |

Alternatively, it is contemplated that the automatic selection may be based on dangerous obstacle 12 detections. For example, if dangerous obstacle 12 is detected within blind spot 28*a*, controller 30 may select camera 36*a*. In yet another alternative, it is contemplated that the operator may indirectly via input device 60 and controller 30 select which camera 36 images are displayed.

Portion 66 may include an indicator 70 and a text box 72, each configured to communicate a status of collision avoidance system 29. In particular, controller 30 may vary the appearance of indicator 70 to indicate whether the color scheme of portion 62 is active or inactive. For example, controller 30 may change the color of indicator 70. Controller 30 may display indicator 70 as red when the color scheme of portion 62 is inactive, and as green when the color scheme of portion 62 is active. Controller 30 may also communicate information to the operator via text box 72. For example, controller 30 may communicate text regarding which camera 36 images are selected.

Figure 9:
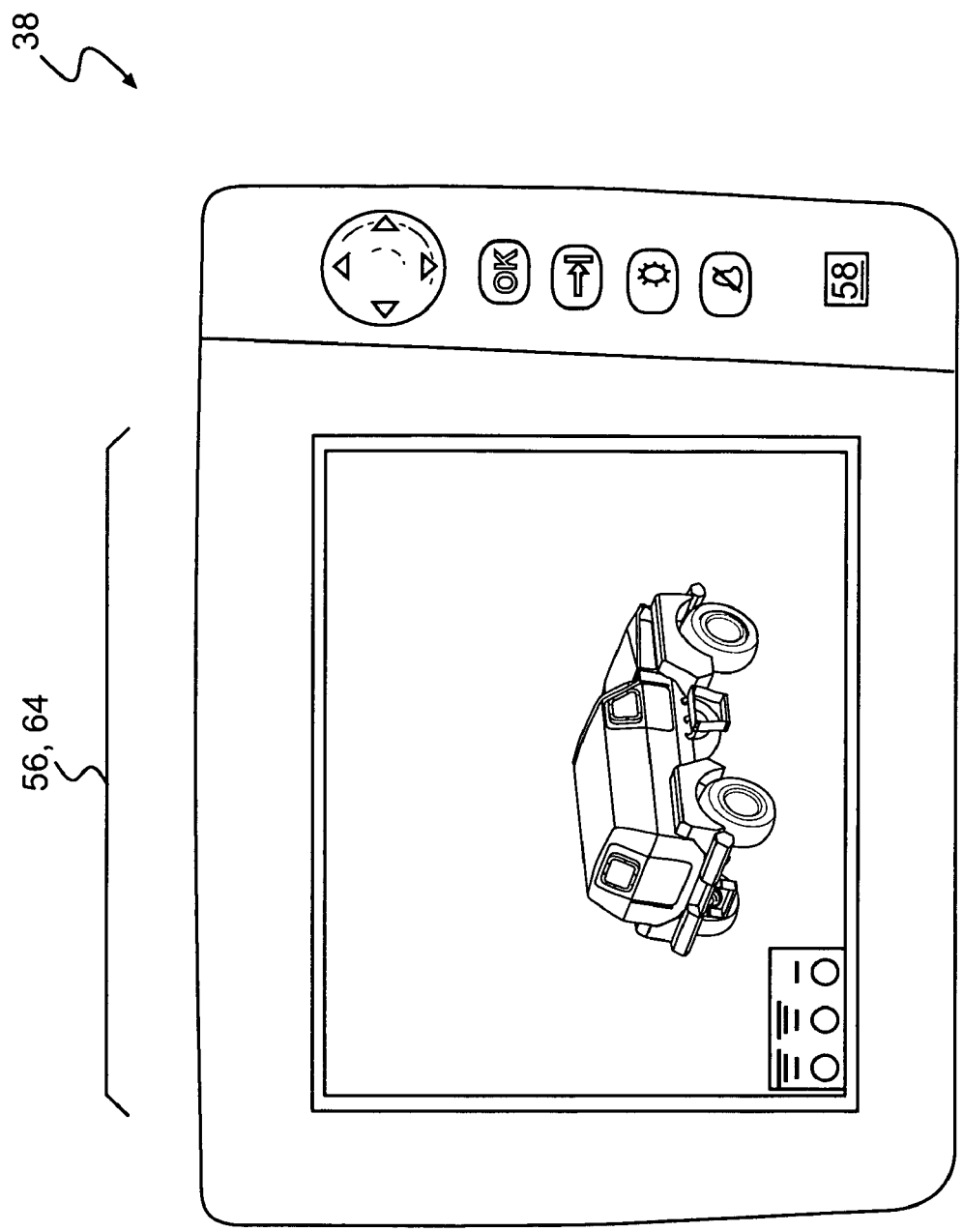
FIG. 9 is a pictorial illustration of the operator interface of FIG. 7 operating in an exemplary disclosed camera mode.

As previously discussed, when obstacle 12 is detected within a certain blind spot 28, camera mode may be utilized to provide to the operator focused information regarding that certain blind spot 28. FIG. 9 illustrates display 56 operating in camera mode. In camera mode, controller 30 may increase a relative size of portion 64. It is contemplated that camera 36 images may thereby be displayed at a higher resolution, allowing the operator to view dangerous obstacle 12 details, for example, license plate numbers.

Figure 10:
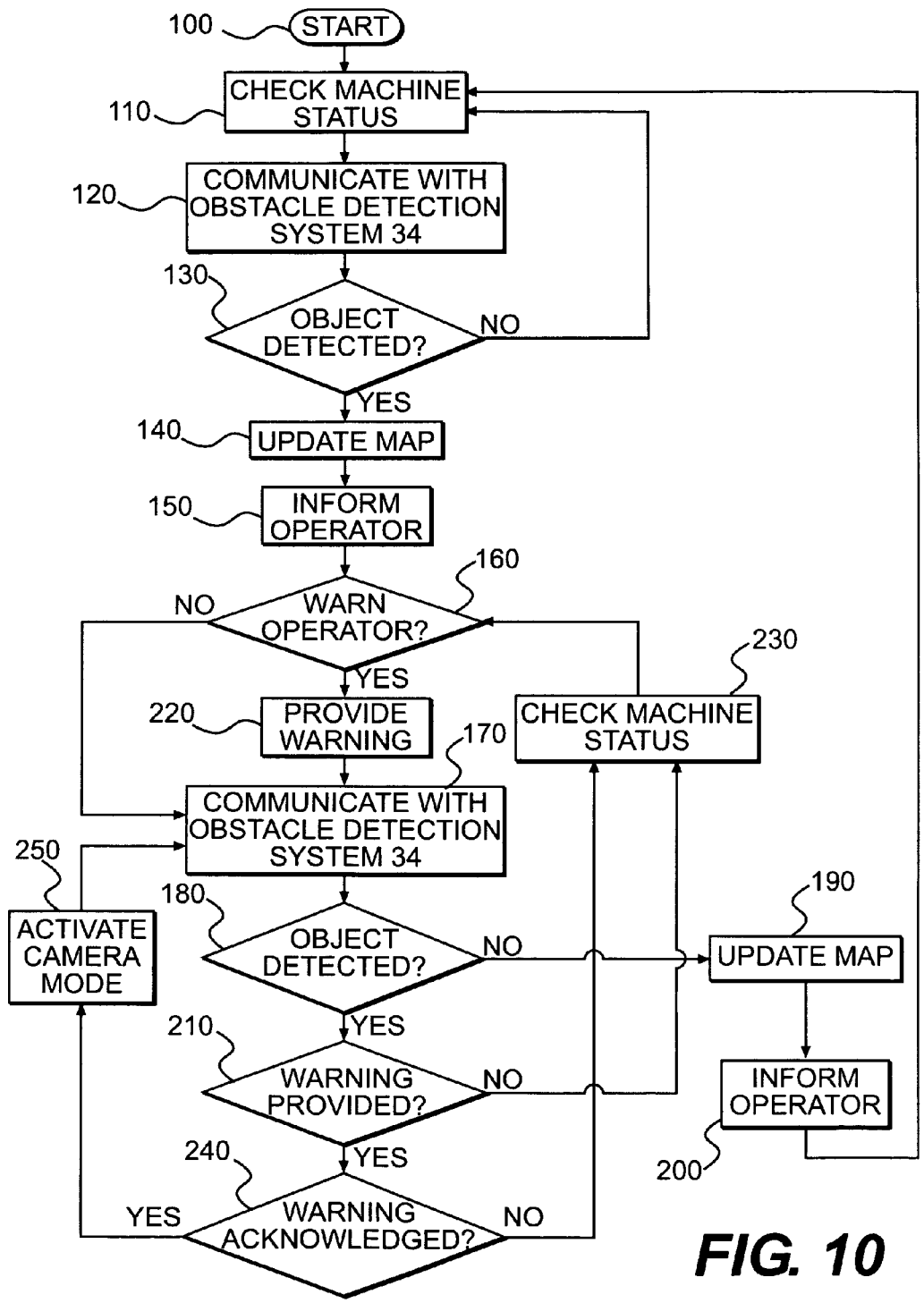
FIG. 10 is a flow chart describing an exemplary method of operating the control system of FIG. 2.

FIG. 10 illustrates an exemplary method of operating collision avoidance system 29. FIG. 10 will be discussed in the following section to further illustrate collision avoidance system 29 and its operation.

Figure 11:
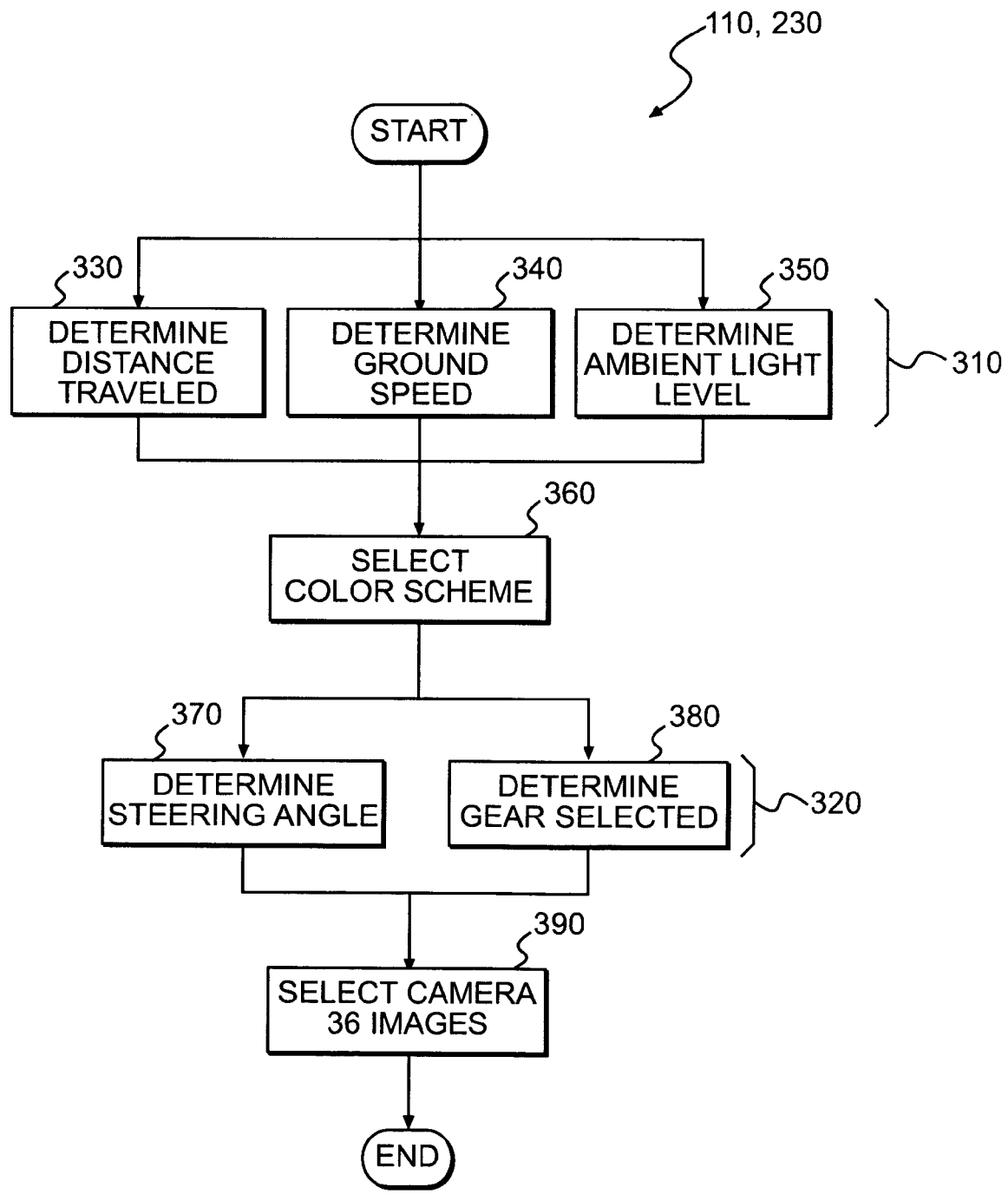
FIG. 11 is a flow chart describing an exemplary method of checking a status of the machine of FIG. 1.

FIG. 11 illustrates an exemplary method of checking a status of machine 10. FIG. 11 will be discussed in the following section to further illustrate collision avoidance system 29 and its operation.

Industrial Applicability

The disclosed collision avoidance system may be applicable to machines, which may intermittently move between and stop at certain locations within a worksite. The system may detect information about an obstacle within a blind spot of the machine, and report this information to an operator of the machine. In particular, the disclosed system may detect a presence of a dangerous obstacle within the blind spot, and warn the operator of this presence. Operation of the system will now be described.

As illustrated in FIG. 10, operation of collision avoidance system 29 may commence at a step 100, which may include initialization of controller 30. Controller 30 may then check a status of machine 10, and adjust the communications of display 56, based on this status (step 110). Next, controller 30 may communicate with obstacle detection system 34 (step 120), which may determine whether dangerous obstacle 12 is detected within blind spot 28 (step 130). If dangerous obstacle 12 is not detected within blind spot 28, controller 30 may return to step 110 and again check the status of machine 10.

The initialization of step 100 may involve populating default values. It is contemplated that this initialization may be performed during installation of collision avoidance system 29. In particular, the criticality values associated with each blind spot 28 may be defined. The camera 36 images, which are communicated via display 56 at machine startup, may also be selected. It is contemplated that after machine startup, the operator may via input device 60 select other camera 36 images for communication via display 56. For example, if display 56 and input device 60 together embody a touch screen, the operator may touch one icon 68. Controller 30 may determine that this icon 68 represents a certain blind spot 28. Controller 30 may then select camera 36 images associated with this certain blind spot 28. Moreover, after machine startup, the operator may via input device 60 activate camera mode to obtain focused information regarding one blind spot 28. During the initialization, the color scheme of portion 62 may also be selected. This color scheme may be altered after machine startup, based upon the status of machine 10. For example, when ambient light levels decrease below a certain level, controller 30 may switch the color scheme of portion 62 from day to night. Alternatively, the initialization may be performed at a service interval of machine 10, or during operation of collision avoidance system 29.

As illustrated in FIG. 11, it is contemplated that checking the status of machine 10 (step 110), may include checking a plurality of statuses of machine 10. This checking of the plurality of statuses of machine 10 may occur simultaneously or serially, and each status of machine 10 may be stored in the memory of controller 30 for later use. Moreover, the plurality of statuses of machine 10 may be divided into one or more groups of statuses. Each group of statuses may serve as the basis for a specific adjustment of the communications of display 56. For example, one group of statuses may include the distance traveled by machine 10, the ground speed of machine 10, and the ambient light level within operator station 24. Another group of statuses may include the steering angle of machine 10 and the gear selection of the transmission of machine 10. It is contemplated that controller 30 may first check one group of statuses (step 310). Specifically, controller 30 may communicate with interface module 35 to determine the distance traveled by machine 10 (step 330), the ground speed of machine 10 (step 340), and the ambient light level within operator station 24 (step 350). It is contemplated that these determinations may include calculations by controller 30. For example, the distance traveled by machine 10 may be calculated based on the ground speed of machine 10 and an elapsed time. Next, controller 30 may select the color scheme of portion 62, based on these determinations (step 360). Controller 30 may select the color scheme of portion 62 in accordance with Table 4. For example, if machine 10 has traveled less than 20 meters since its last full stop and the ambient light level is high, controller 30 may select the day color scheme. But, if machine 10 has traveled more than 20 meters since its last full stop and the ground speed of machine 10 is not zero miles per hour, controller 30 may select the sleep color scheme. Simultaneously with or after steps 310 and 360, controller 30 may check another group of statuses (step 320). Specifically, controller 30 may communicate with interface module 35 to determine the steering angle of machine 10 (step 370) and the gear selection of the transmission of machine 10 (step 380). Controller 30 may then select the camera 36 images, which are communicated via display 56 (step 390). Controller 30 may select the camera 36 images in accordance with Table 6. For example, if the steering angle of machine 10 is leftward and the gear selected is a forward gear, controller 30 may select camera 36f images. After the adjustments of steps 360 and 390, controller 30 may proceed to step 120 as illustrated in FIG. 10.

The communication of step 120 may involve one or more obstacle detection systems 34. It is contemplated that controller 30 may communicate with one obstacle detection system 34 at a time. For example, controller 30 may communicate with obstacle detection system 34a. Controller 30 may then complete steps 130-250 based on this communication with obstacle detection system 34a. Next, controller 30 may communicate with obstacle detection system 34b. Controller 30 may then complete steps 130-250 based on this communication with obstacle detection system 34b. It is contemplated that controller 30 may then again communicate with obstacle detection system 34a or another obstacle detection system 34. Alternatively, controller 30 may simultaneously communicate with a plurality of obstacle detection systems 34. For example, controller 30 may simultaneously communicate with obstacle detection systems 34a and 34b. Controller 30 may then complete steps 130-250 based on these communications with obstacle detections systems 34a and 34b. Specifically, controller 30 may complete steps 130-250 based on the communication with obstacle detection system 34a. Simultaneously, controller 30 may also complete steps 130-250 based on the communications with obstacle detection system 34b.

The communications of step 120 may include detection values determined by each obstacle detection system 34 during step 130. As previously discussed, detection value 1 may correspond to a dangerous obstacle 12 detection, while detection value 0 may correspond to a dangerous obstacle 12 non-detection. The determination of step 130 may include sub-steps. For example, each obstacle detection system 34, and more specifically, each obstacle sensor 39 may scan (i.e. detect points within) blind spot 28. Each obstacle sensor 39 may then communicate data regarding these scans (i.e. the raw locations of the points) to controller 40. Controller 40 may aggregate the raw locations of the points and then determine an attribute of at least one obstacle 12. In particular, controller 40 may apply a height filter to the points, thereby removing ground surfaces. Next, controller 40 may filter out the points on surfaces of obstacles 12 that are not dangerous. Specifically, controller 40 may filter out the points that represent transient (unstable) RADAR returns. For example, the points that are detected for not more than a sustained period of five-hundred milliseconds may be filtered out. The points that remain may be classified as dangerous obstacles 12. Alternatively, controller 40 may filter out obstacles 12 that are not a certain size. Controller 40 may convert the height filtered points into obstacles 12 through blob extraction, which is known in the art of computer graphics. Controller 40 may then apply a size filter to obstacles 12. Specifically, controller 40 may filter out obstacles 12 that have height 16 not longer than length 22, width 18 not longer than length 22, and depth 20 not longer than length 22 (referring to FIG. 1). By filtering out these obstacles 12, only dangerous obstacles 12 may remain. The filtering may be accomplished by first calculating height 16, width 18, and depth 20. The longest of height 16, width 18, and depth 20 may then be compared to length 22. If the longest of height 16, width 18, and depth 20 is not longer than length 22, obstacle 12 may be filtered out. But, if the longest of height 16, width 18, and depth 20 is longer than length 22, obstacle 12 may be retained and classified as dangerous.

Each obstacle detection system 34, and more specifically, each controller 40 may then generate and communicate to controller 30 a signal corresponding to detection value 0 or 1. In particular, if any points and/or obstacles 12 have been classified as dangerous obstacles 12, controller 40 may generate and communicate to controller 30 a signal corresponding to detection value 1. Otherwise, controller 40 may generate and communicate to controller 30 a signal corresponding to detection value 0.

If controller 30 receives a signal corresponding to detection value 0, controller 30 may return to step 110 and again check the status of machine 10. But, if controller 30 receives a signal corresponding to detection value 1 (i.e. dangerous obstacle 12 is detected within blind spot 28), controller 30 may update map 32, based on the detection (step 140). If the color scheme of portion 62 is active, controller 30 may then inform the operator of the detection by updating the visual representation of map 32 communicated via display 56 (step 150). Simultaneously with or after step 150, and regardless of the color scheme of portion 62, controller 30 may determine whether to warn the operator of the dangerous obstacle 12 detection (step 160). If a dangerous obstacle 12 warning is not required, controller 30 may again communicate with obstacle detection system 34 (step 170), which may again determine whether dangerous obstacle 12 is detected within blind spot 28 (step 180). Steps 170 and 180 may be equivalent to steps 120 and 130, respectively. If at step 180 dangerous obstacle 12 is not detected within blind spot 28, controller 30 may update map 32, based on the non-detection (step 190). If the color scheme of portion 62 is active, controller 30 may then inform the operator of the non-detection by updating the visual representation of map 32 communicated via display 56 (step 200). Regardless of the color scheme of portion 62, controller 30 may then return to step 110 and again check the status of machine 10.

The informing of step 150 may include sub-steps. Controller 30 may activate mixed mode (referring to FIG. 7), if display 56 is operating in camera mode. Next, controller 30 may vary the appearance of one icon 68 to indicate the detection of dangerous obstacle 12 within blind spot 28. In particular, controller 30 may vary the appearance of icon 68 in accordance with the selected color scheme and Table 5. For example, if the day color scheme is selected, icon 68 may be shown as red or yellow. Icon 68 may be shown as red if blind spot 28 has a criticality value of 1 (i.e. dangerous obstacle 12 is threatening), while icon 68 may be shown as yellow if blind spot 28 has a criticality value of 0 (i.e. dangerous obstacle 12 is not threatening). Additionally, controller 30 may select which camera 36 images are communicated via portion 64 of display 56, based on the dangerous obstacle 12 detection. For example, if dangerous obstacle 12 is detected within blind spot 28a, controller 30 may select camera 36a. Alternatively, the selection by controller 30 of which camera 36 images are communicated may be included in step 220, discussed below.

The determination of whether to warn the operator of the dangerous obstacle 12 detection (step 160) may be based upon the criticality value of blind spot 28 and/or the status of machine 10. For example, a warning may be required if blind spot 28 has a criticality value of 1. Alternatively or additionally, a warning may only be required if the steering angle of machine 10 and the gear selection of the transmission of machine 10 are such that machine 10 may move toward obstacle 12. For example, if obstacle 12 is detected within blind spot 28f, blind spot 28f has a criticality value of 1, the steering angle of machine 10 is leftward, and the gear selected is a forward gear, a warning may be required. But, if obstacle 12 is detected within blind spot 28f, blind spot 28f has a criticality value of 1, the steering angle of machine 10 is leftward, and the gear selected is a reverse gear, a warning may not be required. In addition, a warning may only be required when the selected color scheme of portion 62 is active. For example, if obstacle 12 is detected within blind spot 28f, the steering value of machine 10 is leftward, the gear selected is a forward gear, and the selected color scheme of portion 62 is inactive, a warning may not be required.

Similar to the informing of step 150, the informing of step 200 may also include sub-steps. Controller 30 may activate mixed mode (referring to FIG. 7), if display 56 is operating in camera mode. Next, controller 30 may vary the appearance of one icon 68 to indicate the non-detection of dangerous obstacle 12 within blind spot 28. In particular, controller 30 may vary the appearance of icon 68 in accordance with the selected color scheme and Table 5. For example, if the day color scheme is selected, icon 68 may be shown as black.

If at step 180 dangerous obstacle 12 is detected within blind spot 28, controller 30 may determine whether at step 160 controller 30 determined that a warning was required (step 210). If at step 160 controller 30 determined a warning was not required, controller 30 may again check the status of machine 10, and adjust the communications of display 56 based on this status (step 230). Step 230 may be equivalent to step 110 (referring to FIG. 11). Controller 30 may then again determine whether to warn the operator of the dangerous obstacle 12 detection (step 160).

If at step 160 controller 30 determines that a warning is required, controller 30 may provide a dangerous obstacle 12 warning to the operator (step 220). This warning may be provided via display 56. Specifically, controller 30 may alter the appearance of one icon 68 to warn the operator of the detection of dangerous obstacle 12 within blind spot 28. In particular, controller 30 may alter the appearance of icon 68 in accordance with the selected color scheme of Table 5. For example, if the day color scheme is selected, icon 68 may flash intermittently between black and red. Additionally or alternatively, controller 30 may activate warning device 58 to provide the dangerous obstacle 12 warning to the operator.

Controller 30 may also select which camera 36 images are communicated via portion 64 of display 56, based on the dangerous obstacle 12 detection. For example, if dangerous obstacle 12 is detected within blind spot 28a, controller 30 may select camera 36a. Controller 30 may then again communicate with obstacle detection system 34 (step 170), which may again determine whether dangerous obstacle 12 is detected within blind spot 28 (step 180). If dangerous obstacle 12 is not detected within blind spot 28, controller 30 may update map 32 based on the non-detection, as previously discussed (step 190).

If at step 160 controller 30 determined that a warning was required and at step 180 dangerous obstacle 12 is detected, controller 30 may determine whether the operator has acknowledged the dangerous obstacle 12 warning provided at step 220 (hereafter the "first dangerous obstacle 12 warning") (step 240). It is contemplated that the operator may acknowledge the first dangerous obstacle 12 warning by making a selection via input device 60. Therefore, if the operator has not made a selection via input device 60, the operator may not have acknowledged the first dangerous obstacle 12 warning. If the operator has not acknowledged the first dangerous obstacle 12 warning, controller 30 may again check the status of machine 10, and adjust the communications of display 56, based on this status (step 230).

If at step 240 controller 30 determines that the operator has acknowledged the first dangerous obstacle 12 warning, controller 30 may respond to the operator's selection. For example, controller 30 may activate camera mode (step 250). Controller 30 may also deactivate warning device 58. Controller 30 may then return to step 170 and again communicate with obstacle detection system 34.

It is contemplated that collision avoidance system 29 may reduce the effect of dangerous obstacle 12 by indicating dangerous obstacle 12 detections to the operator. It is further contemplated that the color schemes of portion 62 may prevent these indications from confusing or annoying the operator. Specifically, the color schemes may highlight some dangerous obstacle 12 detections, while suppressing others. For example, if machine 10 has a ground speed of zero miles per hour, dangerous obstacle 12 may move and stop near machine 10 completely unnoticed by the operator, raising the importance of dangerous obstacle 12 detections. Therefore, an active color scheme such as the day color scheme may be used to highlight these dangerous obstacle 12 detections. Alternatively, if machine 10 is moving and has moved more than 20 meters since its last full stop, it may be unlikely that obstacle 12 may move and stop near machine 10 completely unnoticed by the operator. Therefore, an inactive color scheme such as the sleep color scheme may be used to suppress these dangerous obstacle 12 detections, which may confuse or annoy the operator.

It is also contemplated that collision avoidance system 29 may maximize the effectiveness of dangerous obstacle 12 warnings by restricting their use. In particular, dangerous obstacle 12 warnings may not reduce the effect of dangerous obstacle 12 in all cases. For example, if machine 10 may not move toward dangerous obstacle 12, a dangerous obstacle 12 warning may not reduce the effect of dangerous obstacle 12. Therefore, dangerous obstacle 12 warnings may only be provided when machine 10 may move toward dangerous obstacle 12. Restricting the number of dangerous obstacle 12 warnings may maximize their effectiveness because the operator of machine 10 may not become annoyed or confused by extraneous dangerous obstacle 12 warnings.

It will be apparent to those skilled in the art that various modifications and variations can be made to the method and system of the present disclosure. Other embodiments of the method and system will be apparent to those skilled in the art from consideration of the specification and practice of the method and system disclosed herein. It is intended that the specification and examples be considered as exemplary only, with a true scope of the disclosure being indicated by the following claims and their equivalents.

What is claimed is:

1. A collision avoidance system for a machine, comprising:
a first obstacle detection system configured to detect a first obstacle and generate a corresponding first signal;
an operator interface including a display configured to communicate visual information to an operator;
an interface module configured to detect a status of the machine and generate a corresponding second signal; and
a controller in communication with the first obstacle detection system, the operator interface, and the interface module, and configured to:
control the display to indicate an obstacle detection to the operator, based on the first and second signals; and
control the display to provide an obstacle warning to the operator, based on the first and second signals,
determine a ground speed of the machine;
determine a distance since the ground speed of the machine was last zero;
control at least a portion of the display to suppress the indication of the obstacle detection based on the distance since the ground speed of the machine was last zero being more than a threshold distance; and the ground speed of the machine being above a threshold speed.

2. The collision avoidance system of claim 1, wherein the status of the machine includes at least one of the ground speed of the machine, a gear selection of a transmission of the machine, a steering angle of the machine, and the distance traveled by the machine.

3. The collision avoidance system of claim 1, wherein indicating the obstacle detection includes controlling a first portion of the display to communicate a visual representation of a map.

4. The collision avoidance system of claim 3, wherein providing the obstacle warning includes altering the visual representation of the map.

5. The collision avoidance system of claim 3, wherein the controller is further configured to control a second portion of the display to communicate a status of the collision avoidance system.

6. The collision avoidance system of claim 3, further including a first camera situated to capture images of a first blind spot of the machine and configured to generate a corresponding third signal, wherein:
the detection of the first obstacle is within the first blind spot;
the controller is in further communication with the first camera; and
the display is controlled, based further on the third signal.

7. The collision avoidance system of claim 6, further including a second obstacle detection system configured to detect a second obstacle within a second blind spot of the machine and generate a corresponding fourth signal, wherein the controller is in further communication with the second obstacle detection system and at least one of:
the indication of the obstacle detection is based further on the fourth signal; and
the provision of the obstacle warning is based further on the fourth signal.

8. The collision avoidance system of claim 7, further including a second camera situated to capture images of the second blind spot, and configured to generate a corresponding fifth signal, wherein the controller is in further communication with the second camera, and is further configured to control a second portion of the display to communicate the captured images of one of the first and second blind spots, based on the second, and one of the third and fifth signals.

9. The collision avoidance system of claim 7, wherein the first camera is situated to capture images of the first blind spot of the machine and the second blind spot of the machine.

10. An off-highway haul truck, comprising:
an operator station; and
a collision avoidance system including:
a first obstacle detection system configured to detect a first obstacle and generate a corresponding first signal;
an operator interface situated within the operator station and including a display configured to communicate visual information to an operator;
an interface module configured to detect a status of the haul truck and generate a corresponding second signal; and
a controller in communication with the first obstacle detection system, the operator interface, and the interface module, and configured to:
determine a ground speed of the haul truck;
determine a distance since the ground speed of the machine was last zero;
control the display to indicate an obstacle detection to the operator, based on the first and second signals;
control the display to provide an obstacle warning to the operator, based on the first and second signals, wherein the controller is configured to control at least a portion of the display to suppress the indication of the obstacle detection based on:
the ground speed of the haul truck being above a threshold speed; and
the distance since the ground speed of the haul truck was last zero being more than a threshold distance.

11. The haul truck of claim 10, wherein the status of the haul truck includes at least one of the ground speed of the haul truck, a gear selection of a transmission of the haul truck, a steering angle of the haul truck, and the distance traveled by the haul truck.

12. The haul truck of claim 10, wherein:
the collision avoidance system further includes a first camera situated to capture images of a first blind spot of the haul truck and configured to generate a corresponding third signal;
the detection of the first obstacle is within the first blind spot;
the controller is in further communication with the first camera; and
the display is controlled, based further on the third signal.

13. The haul truck of claim 12, wherein the collision avoidance system further includes a second obstacle detection system configured to detect a second obstacle within a second blind spot of the haul truck and generate a corresponding fourth signal, wherein the controller is in further communication with the second obstacle detection system and at least one of:
the indication of the obstacle detection is based further on the fourth signal; and
the provision of the obstacle warning is based further on the fourth signal.

14. The haul truck of claim 13, wherein the collision avoidance system further includes a second camera situated to capture images of the second blind spot, and configured to generate a corresponding fifth signal, wherein the controller is in further communication with the second camera, and is further configured to control a first portion of the display to communicate the captured images of one of the first and second blind spots, based on the second, and one of the third and fifth signals.

15. The haul truck of claim 13, wherein the first camera is situated to capture images of the first blind spot of the haul truck and the second blind spot of the haul truck.

16. A collision avoidance system for a machine, comprising:
- a first obstacle detection system configured to detect a first obstacle and generate a corresponding first signal;
- an operator interface including a display configured to communicate visual information to an operator;
- an interface module configured to detect a status of the machine and generate a corresponding second signal; and
- a controller in communication with the first obstacle detection system, the operator interface, and the interface module, and configured to
  - control the display to indicate an obstacle detection to the operator, based on the first and second signals,
  - determine a ground speed of the machine;
  - determine a distance since the ground speed of the machine was last zero after each full stop made by the machine; and
  - control at least a portion of the display to suppress the indication of the obstacle detection based on:
    - the ground speed of the machine being above a threshold speed; and
    - the distance since the ground speed of the machine was last zero being more than a threshold distance.

17. The collision avoidance system of claim 16, wherein the controller is further configured to stop suppressing the obstacle detection when the ground speed of the machine is zero.

18. The collision avoidance system of claim 16, wherein the machine is an off-highway haul truck and the display is an LCD screen.

19. The collision avoidance system of claim 18, wherein the controller is configured to determine a steering angle of the machine upon turning of the machine and display on the display images from a camera directed generally in the direction of the turn.

20. The collision avoidance system of claim 1, wherein the controller suppresses obstacle detection by causing the at least a portion of the display to display a static image.

21. The collision avoidance system of claim 20, wherein the static image comprises diagonal lines.

22. The collision avoidance system of claim 1, wherein the controller is configured to determine the distance since the ground speed of the machine was last zero after each full stop made by the machine.

23. The haul truck of claim 10, wherein the controller is configured to determine the distance since the ground speed of the haul truck was last zero after each full stop made by the haul truck.

24. The collision avoidance system of claim 3, wherein the at least portion of the display is first portion.

* * * * *

UNITED STATES PATENT AND TRADEMARK OFFICE
CERTIFICATE OF CORRECTION

PATENT NO.         : 8,170,787 B2                                                Page 1 of 1
APPLICATION NO.    : 12/081345
DATED              : May 1, 2012
INVENTOR(S)        : Coats et al.

It is certified that error appears in the above-identified patent and that said Letters Patent is hereby corrected as shown below:

In the Specification,

Column 10, line 11, delete "Industrial Applicability" and insert -- INDUSTRIAL APPLICABILITY --.

In the Claims,

Column 16, line 29, in Claim 10, delete "last zero:" and insert -- last zero; --.

Column 17, line 25, in Claim 16, delete "configured to" and insert -- configured to: --.

Column 18, line 31, in Claim 24, delete "at least portion of the display is first portion." and insert -- at least a portion of the display is the first portion. --.

Signed and Sealed this
Eighteenth Day of August, 2015

Michelle K. Lee
*Director of the United States Patent and Trademark Office*